United States Patent
Bullukian et al.

(10) Patent No.: US 9,553,780 B1
(45) Date of Patent: *Jan. 24, 2017

(54) BI-DIRECTIONAL REAL-TIME DATA CONNECTION TROUBLESHOOTING

(71) Applicant: Sprint Communications Company L.P., Overland Park, KS (US)

(72) Inventors: Dana Bullukian, Ocoee, FL (US); Brian Lushear, Winter Springs, FL (US); Todd Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 49 days.

This patent is subject to a terminal disclaimer.

(21) Appl. No.: 14/645,370

(22) Filed: Mar. 11, 2015

Related U.S. Application Data

(63) Continuation-in-part of application No. 13/831,494, filed on Mar. 14, 2013, now Pat. No. 9,001,685.

(51) Int. Cl.
| | | |
|---|---|---|
| *H04M 15/00* | (2006.01) | |
| *H04J 1/16* | (2006.01) | |
| *H04L 12/24* | (2006.01) | |
| *H04L 12/26* | (2006.01) | |
| *G06Q 30/00* | (2012.01) | |

(52) U.S. Cl.
CPC ......... *H04L 41/5025* (2013.01); *G06Q 30/016* (2013.01); *H04L 43/50* (2013.01)

(58) Field of Classification Search
CPC ............. H04L 41/0631; H04L 41/5038; H04L 41/5074; H04L 43/0829
See application file for complete search history.

(56) References Cited

U.S. PATENT DOCUMENTS

| | | | |
|---|---|---|---|
| 8,116,224 B2 | 2/2012 | Bugenhagen | |
| 8,279,759 B1 | 10/2012 | Jones | |
| 9,001,685 B1 | 4/2015 | Lushear et al. | |
| 2010/0061261 A1* | 3/2010 | Bugenhagen | H04L 12/2602 370/252 |
| 2012/0169494 A1* | 7/2012 | Grillo | H04L 41/0866 340/540 |
| 2012/0257535 A1* | 10/2012 | DeWath | H04L 43/10 370/253 |

OTHER PUBLICATIONS

FAIPP Pre-Interview Communication dated Oct. 1, 2014, U.S. Appl. No. 13/831,494, filed Mar. 14, 2013.
Notice of Allowance dated Dec. 3, 2014, U.S. Appl. No. 13/831,494, filed Mar. 14, 2013.

* cited by examiner

*Primary Examiner* — Awet Haile

(57) ABSTRACT

A method of troubleshooting a communication service, a troubleshooting tool, and a system are disclosed. Each involves bi-lateral testing of a customer premise equipment in a customer network and a communication service provider router in a communication service provider network. Bi-directional information generated in the bi-lateral testing is stored in a datastore for later retrieval in troubleshooting the customer premise equipment and communication service provider router. User interaction is also stored in the datastore to track customer behavior which can be used alone or in combination with the bi-directional information to monitor performance and/or troubleshoot the customer premise equipment and communication service provider router.

18 Claims, 4 Drawing Sheets

BI-DIRECTIONAL REAL-TIME DATA CONNECTION TROUBLESHOOTING

CROSS-REFERENCE TO RELATED APPLICATIONS

This is a Continuation-in-part Patent Application claiming priority to U.S. patent application Ser. No. 13/831,494, filed Mar. 14, 2013, entitled "Bi-Directional Real-Time Data Connection Troubleshooting," by Brian Lushear, et al., which is herein incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An enterprise or business customer may subscribe to a variety of communication services provided by one or more service providers who operate owned or leased telecommunications equipment. The service provider may allocate common resources of the service provider's telecommunications equipment to a particular customer, while other of the common resources are assigned to other customers. The resources allocated by the service provider to the customer are configured at the service provider's side in accordance with an agreement between the service provider and the customer based on a communication service requested by the customer. The customer premises equipment is configured at the customer's side in accordance with an agreement for interfacing with the service provider's equipment at the service provider's side to allow access to the communication service.

The enterprise or business customer's customer premise equipment may obtain connectivity to the communication service via a port on a router operated by the communication service provider (e.g., a port on a CPE router may communicatively couple to a port on a service provider router). The port on the communication service provider router may be dedicated or reserved primarily or completely for the use of the customer. A router is an electronic device that provides connectivity between two networks and typically supports routing of data packets to other network nodes based on addresses embedded in the header of the data packets.

Communication services may be defined, at least in part, by a service level agreement (SLA) that may define a class of service, a bandwidth, and other key communication parameters. A SLA may also define service availability, time to identify the cause of a customer affecting malfunction, time to repair a customer affecting malfunction, service provisioning time, and other. A quality of service (QoS) and/or a class of service associated with the communication service may be implied by the SLA.

SUMMARY

In an embodiment, a method performed by a communication service troubleshooting tool is disclosed. The method comprises determining a customer premise equipment configuration of the customer premise equipment in the customer network and a router configuration of the communication service provider router providing communication services to the customer premise equipment based on the association, initiating network tests on a customer premise equipment interface of the customer premise equipment and network tests on a router interface of the communication service provider router simultaneously, wherein the customer premise equipment interface and the router interface are configured for the communication service, and collecting customer premise equipment measurements and router measurements generated by the tests initiated on the customer premise equipment interface and the tests initiated on the router interface. The method further comprises determining a difference between the collected customer premise equipment measurements and router measurements, determining whether the difference exceeds a normal threshold, and in response to determining that the difference exceeds the normal threshold, identifying a cause of the difference. The method further comprises changing the customer premises equipment configuration to an acceptable customer premises equipment configuration, the router configuration to an acceptable router configuration, or both, based on i) the cause of the difference, and ii) a solution for the cause which is obtained by comparing the cause, the customer premises equipment configuration, the router configuration, or a combination thereof with information previously stored on a datastore of the communication service provider, wherein the information previously stored comprises a previously stored cause, previously stored bi-directional information, previously stored customer behavior, or a combination thereof.

In an embodiment, a communication service troubleshooting tool is disclosed. The communication service troubleshooting tool comprises instructions stored in memory which, when executed by a processor, perform the steps of creating an association between the customer premise equipment and the communication service provider router, determining a customer premise equipment configuration of the customer premise equipment in the customer network and a router configuration of the communication service provider router in the communication service provider network providing communication services to the customer premise equipment based on the association, and determining customer premise equipment measurements associated with the customer premise equipment and router measurements associated with the communication service provider router based on the association. The communication service troubleshooting tool further comprises instructions stored in memory which, when executed by a processor, perform the steps determining whether the customer premise equipment measurements and the router measurements are normal based on an analysis of the customer premise equipment configuration and the router configuration, in response to determining that the customer premise equipment measurements and the router measurements are not normal, identifying a cause of the abnormal measurements, and storing bi-directional information associated with the customer premise equipment and the communication service provider router in a datastore of the communication service provider.

In an embodiment, a system is disclosed. The system comprises a customer premises equipment residing in a customer network, a communication service provider router residing in a communication service provider network, and a datastore residing in the communication service provider network. The communication service provider router provides communication services to the customer premise equipment. The system further comprises a communication service troubleshooting tool wherein the communication service troubleshooting tool creates an association between the customer premise equipment and the communication service provider router, determines a customer premise equipment configuration of the customer premise equipment in the customer network and a router configuration of the communication service provider router in the communication service provider network providing communication services to the customer premise equipment based on the association, determines customer premise equipment measurements associated with the customer premise equipment and router measurements associated with the communication service provider router based on the association, determines whether the customer premise equipment measurements and the router measurements are normal based on an analysis of the customer premise equipment configuration and the router configuration, in response to determining that the customer premise equipment measurements and the router measurements are not normal, identifies a cause of the abnormal measurements, and stores bi-directional information associated with the customer premise equipment and the communication service provider router in a datastore of the communication service provider.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
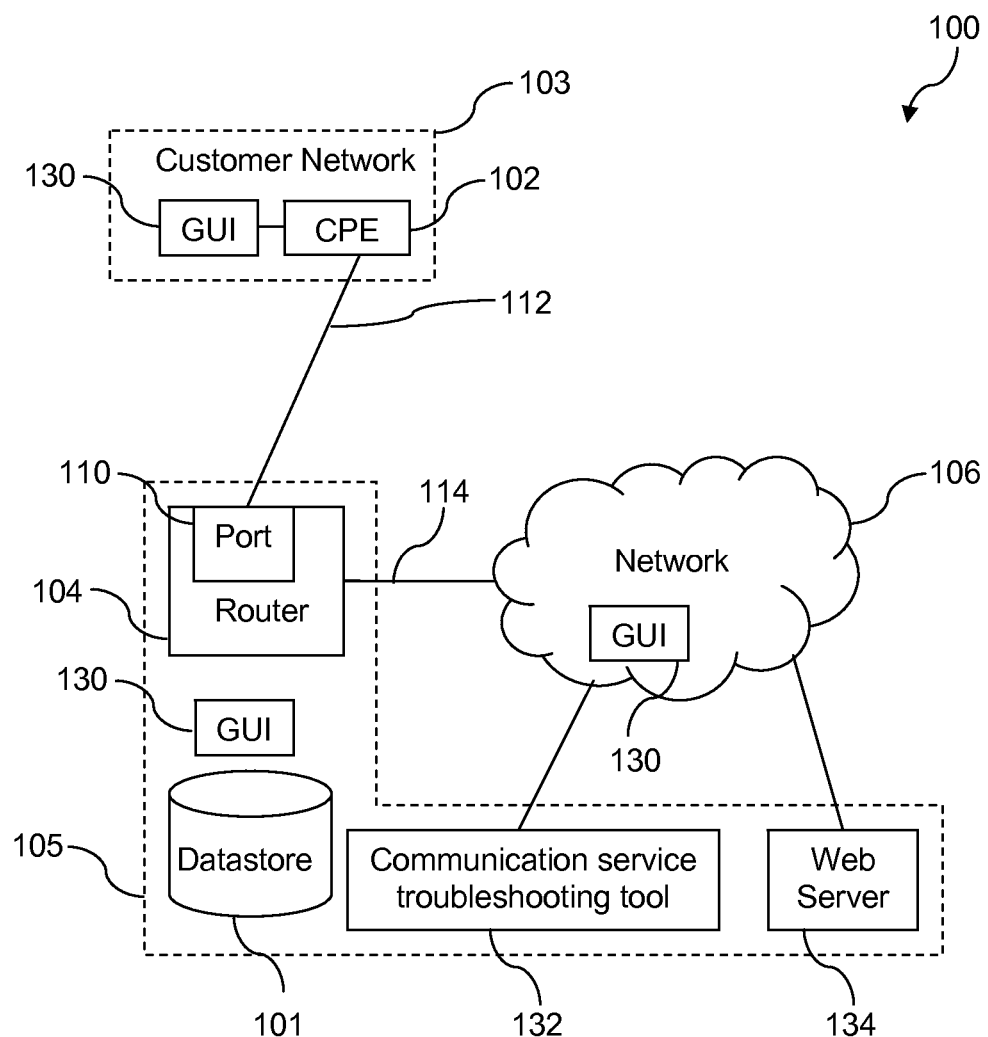
FIG. 1 illustrates an exemplary system for providing a communication service troubleshooting tool.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system, method, and tool for providing real-time bi-lateral troubleshooting of a communication service provisioned to a customer premises equipment by a communication service provider. A service provider may provide communication services to customers. When the communication service is provisioned by the service provider, not only is the service provider's equipment (e.g., a router on the service provider's side) configured to support the customer, but the customer's equipment (e.g., a router on the customer's side) may also be configured to interact with the service provider's equipment providing the communication service. For clarity, the customer's equipment is referred to herein as "customer premises equipment" or "CPE," and the service provider's equipment is referred to herein as "router," "communication service provider router," or "service provider router."

In an embodiment, an interface to the customer premises equipment (CPE) may be configured to support the communication service provided by the service provider. In the course of operation, a customer may notice an issue associated with the communication service. In one instance, the customer may observe a performance level of the communication service that does not meet an agreed upon performance level, for example, a performance level specified in a service level agreement (SLA) with the service provider. In another instance, the customer may merely suspect an issue associated with the communication service. In that case, the customer may want to verify if the suspected problem actually exists. The present disclosure contemplates that actions taken by the customer (e.g., for noticed or suspected issues or problems) may be tracked or monitored as customer behavior via storage in a datastore of the customer service provider. In yet another instance, the customer may not notice or suspect an issue associated with the communication service, while the system, method, and tool automatically detect the issue and, in response to detecting the issue, automatically store information related to the issue, automatically report the issue and/or information to the customer, automatically report the issue and/or information to the communication service provider, automatically open a trouble ticket, or a combination thereof. In such cases, since the present disclosure allows for tracking or monitoring of customer behavior, the lack of an action taken by the customer in the stored customer behavior (e.g., a lack of stored customer behavior over a period of time) may provide a distinguishable insight into the troubleshooting versus issues or problems which may arise when a customer notices or suspects the issues or problems.

When a customer observes or suspects a problem with a communication service, it can be difficult to identify the location of the problem, and consequently, it may be difficult to identify the cause of the problem. For instance, the problem may be at the CPE on the customer side, or the problem may occur at any point between, and including, the CPE at the customer side and the router at the service provider side. However, it may not be possible to isolate any issues unless both sides are analyzed together, or bi-laterally. Accordingly, if a test is run on the customer interface, it may appear that the CPE is performing as desired. On the other hand, if a test is run on the service provider interface, it may appear that the router is also performing as desired. However, it is not until both sets of test results are compared and analyzed that a problem may be detected, or conversely, that the system is performing as intended and no problem exists.

Bi-laterally troubleshooting a communication service provides a way to test and troubleshoot a communication service from both the customer side and the service provider side at the same time. A method, tool, or system for bi-lateral troubleshooting may determine configuration parameters associated with a communication service configured at the customer side and the service provider side.

Tests may be initiated simultaneously on the customer side and the service provider side and measurements collected. The customer may initiate tests through a status query disclosed herein, tests may run automatically at a desired interval in time (e.g., generally over a designated interval of time or upon the occurrence of a trigger condition during normal performance monitoring), or a combination thereof. If the customer initiates a test, the method, system, and tool may notify the customer that no previous test has been run in a recent history (e.g., 10 days, 30 days, or more) or that a previous test has occurred in recent history. Normal performance monitoring, which may monitor performance every five minutes, may automatically trigger a bi-lateral test using an application program interface upon the occurrence of a trigger condition. Performance monitoring information may be stored in the datastore along with the other data stored as described herein. The trigger condition may be a customer behavior threshold (e.g., frequency of customer status queries), a performance threshold (e.g., an overloaded circuit), an abnormal condition (e.g., abnormal performance metric), or a combination thereof. Using bi-lateral testing as described herein may allow the normal performance monitoring to provide a broad-based view of communication service performance (e.g., every five minutes), and the disclosed system, method, and tool may enhance the normal performance monitoring by allowing the collection and storage of bi-directional information at shorter intervals of time (e.g., every 10 seconds).

The measurements may then be analyzed and compared to determine if the communication service is performing at the customer side and service provider side as described in the SLA or if there are discrepancies in the measurements. A difference in measurements at the customer side and the router side may be indicative that the two sides are not treating data traffic the same for the same communication service. By analyzing measurements from both sides and the differences, in conjunction with configuration parameters, mismatches in configuration parameters may be detected and identified as a cause of the problem thereby leading to a quicker resolution of a customer problem.

Troubleshooting a communication service bi-laterally from both sides of the communication path over which the communication service is provided allows detection of problems caused by a mismatch in configuration of the communication service at both ends of the communication path. Conversely, bi-lateral troubleshooting may confirm that both sides of the communication path are configured properly. These bi-lateral troubleshooting results may lead to confirmation that the communication service is performing as intended or point to a cause of the problem other than a mismatch of configuration parameters, thus providing an improved troubleshooting mechanism over one in which each side of a communication path is tested in isolation of the other.

In an embodiment, the two interfaces to be tested and analyzed may be, but are not necessarily, the customer side and the service provider side, as described above. The two interfaces may include a customer interface at one customer wide area network (WAN) site and a customer interface at another customer WAN site, where the customer may want to test not only the separate interfaces at each site, but how the interfaces are interacting together.

Information associated with the bi-lateral troubleshooting (e.g., bi-directional information) may be stored in a datastore of the communication service provider. Storage of the information allows for subsequent retrieval for troubleshooting. For example, upon request by a user or automatically, previously stored information may be retrieved to link the previously stored information to a trouble ticket, to retrieve a report, to retrieve a previously stored trouble ticket linked to the previously stored information, to analyze the previously stored information, to analyze a previously stored trouble ticket(s), to open a trouble ticket, or a combination thereof.

Information associated with the customer's interaction with the communication service may also be stored in the datastore of the communication service provider. Storing customer behavior in a datastore allows for subsequent analysis and/or monitoring of the customer behavior. For example, customer behavior such as the frequency a customer queries for problems, the frequency a customer asks to open a trouble ticket, the frequency the customer accepts an offer to open a trouble ticket, any comments supplied by the customer, which part(s) of the network has the customer identified or indicated has a problem, a lack of customer action, or a combination thereof can be used for troubleshooting. Trends in customer behavior may be identified, and rules may be applied to troubleshoot the system based on the identified trend(s). The customer behavior may be tracked or monitored (e.g., stored) to gain insight into the activities of a customer in relation to the communication service (and/or any equipment involved with providing the communication service).

Storing bi-directional information and customer behavior in a datastore allows for information retrieval by administrators of the communication service provider without restriction as to the time of collection of the information and without restriction as to the particular administrator on duty at the time of information storage. For example, personnel allocated to resolve a trouble ticket may retrieve information regarding the CPE and the router pair previously stored on the datastore and determine if the retrieved information contains insight as to the problem associated with the trouble ticket. Moreover, any personnel may be assigned to resolve the trouble ticket since the datastore allows for systematic storage of information as opposed to allocated personnel having to remember previous problems and recall said previous problems from memory in order to provide insight as to the problem associated with the trouble ticket.

In the embodiments described herein, customer behavior can be analyzed alone or in combination with information (e.g., bi-directional information) obtained from testing in order to troubleshoot the communication service. For example, the embodiments described herein allow for monitoring over a period of time how often (e.g., the frequency) a customer queries the status of a network component or condition, how often (e.g., the frequency) a problem exists versus how often a customer has a status query, how often (e.g., the frequency) a customer requests to open a trouble ticket, which conditions existed at the time of the customer's query and/or request to open a trouble ticket, any comments the customer has provided, a lack of customer action (lack of data stored as customer behavior), or combination thereof.

Analyzing customer behavior alone can allow a communication service provider administrator to determine, for example, whether a customer is proactive or reactive in relation to the provided communication service (e.g., determined by a threshold frequency for a customer's monitoring activity), or whether the customer notices or suspects an issue or problem (e.g., based on stored customer behavior). Such determination may be made by statistical analyses of the customer behavior. For example, for a proactive customer, the disclosed system, method, and tool may automatically perform bi-lateral testing and open a trouble ticket for the communication service based on a threshold frequency for a customer's monitoring activity.

Analyzing customer behavior in combination with information (e.g., bi-directional information) obtained from testing can allow for comparison of the customer behavior to the bi-lateral testing results and statistical analysis of the customer behavior to aid in troubleshooting. Moreover, analysis of customer behavior allows for insight into customer behavior over a period of time. For example, comparison of the customer behavior to the bi-lateral test results can reveal (for a given period of time) a customer always or frequently notices or suspects a problem when there is no problem, a customer notices or suspects a problem when a problem indeed exists, a customer infrequently or never notices or suspects a problem when a problem indeed exists. Thus, analyzing customer behavior in combination with the bi-lateral test results allows the system, method, and tool of the present disclosure to determine whether a customer is monitoring the communication service and the frequency of the customer's monitoring activity in comparison to the existence of an issue or problem with the service, thus indicating the customer appreciates there is an issue or problem in combination with the existence of an actual problem (e.g., an overloaded circuit).

Additionally, the disclosed embodiments allow customers the flexibility to be proactive or reactive, or alternate between proactive and reactive states over time. Customers who desire to be proactive can provide more input in the troubleshooting of a communication service, while customers who desire to be reactive can choose different points in the troubleshooting regime to provide input, or can choose to allow the disclosed embodiments to troubleshoot the communication service without any need for the customer's interaction.

Additionally still, storing the data (e.g., bi-directional information, customer behavior) as described herein may provide, upon troubleshooting, a context for the test results. For example, a communication service provider administrator may view the test results in context of the specific time of the test, the equipment associated with the test (e.g., a specific communication link), the type of the equipment, the syntax used by the equipment, the existence of a previously existing trouble ticket, the existence of previously stored data (e.g., concerning the customer, the involved equipment, the involved communication service, or a combination thereof), or a combination thereof.

Using the data and/or information stored on the datastore of the communication service provider, the communication service provider may decide to take an action (e.g., proactive outreach to the customer, proactive effort to fix a problem or cause of the communication service, begin monitoring all or a part of the communication service, begin monitoring the customer behavior, change or adjust an aspect of monitoring all or a part of the communication service and/or customer behavior (e.g., frequency, monitoring type, target equipment, or a combination thereof), change a customer premises equipment configuration to an acceptable customer premises equipment configuration, change a router configuration to an acceptable router configuration, or a combination thereof), or not to take an action, based on: i) the cause of the problem (e.g., a difference in configurations), and ii) a comparison of the cause to the same or similar problems and/or solutions which were previously stored and are retrievably stored on the datastore of the communication service provider for analysis. For example, the communication service provider may decide to take an action, or not to take an action, based on: i) the cause of the problem, and ii) a solution for the cause which is obtained by comparing the cause, the customer premises equipment configuration, the router configuration, or a combination thereof with any of the information and/or data disclosed herein which has been previously stored on the datastore of the communication service provider. In embodiments where the information includes customer behavior, the disclosed embodiments allow for the communication service provider to decide upon an action based on customer behavior, thus providing a distinguishable insight into the troubleshooting because the communication service provider has information (e.g., customer behavior information) which allows the communication service provider to better understand the status of the communication service from the customer's perspective.

Turning now to FIG. 1, a system 100 is discussed that illustrates one or more embodiments of the disclosure. The system 100 includes customer premises equipment (CPE) 102 in communication with a router 104 that provides connectivity to the network 106 to the CPE 102. The CPE 102 may be located in the customer network 103. The router 104 may be located in a communication service provider network 105, also referred to as service provider network. The internet connectivity or other communication service may be provided by a port 110 on the router 104. The port 110 may be dedicated to the use of the CPE 102 or may be shared by a plurality of CPEs. The system 100 may further include a datastore 101 which stores information generated, for example, by the system 100. The datastore 101 may reside in the communication service provider network 105 and may communicate with one or more components of the system 100 (e.g., troubleshooting tool 132, web server 134, router 104, or a combination thereof) to effect storage of information. The datastore 101 may comprise a single component in the system 100 or multiple components in the system 100 which share and/or transfer the storage functionality described herein for the datastore 101.

The communication service may be provided, in part, over a communication path 112. In an embodiment, the communication path 112 may be provided between the CPE 102 and the router 104. The router 104 may provide access to the communication service, for example, network 106 via link 114. Network 106 may comprise one or more private networks, one or more public networks, or a combination thereof. The network 106 may comprise a portion of the Internet or be communicatively coupled to the Internet. Thus, the CPE 102 may access the network 106, for example, to access content from a content server (not shown) via the communication path 112 from the CPE 102 to the router 104.

The communication path 112 is established between a first interface at CPE 102 and a second interface at the router 104. In an embodiment, one or both of the CPE 102 and router 104 interfaces may be a wired interface. In an embodiment, a wired interface may be an Ethernet interface or other standard wired interface. In another embodiment, one or both of the CPE 102 and router 104 interfaces may be wireless interfaces. In an embodiment, the CPE interface may be wireless and the router interface may be wired. Further, while the communication service is promoted by the Internet connectivity, a variety of different communication services may be provided by such Internet connectivity. The communication service may include one or more of VPN service, email service, multimedia communication service, video conferencing service, voice communication service, and other communication services.

While a single communication path 112 is depicted in FIG. 1, in some embodiments, multiple communication paths 112 may be employed to provide the communication service, for example, depending on the communication volume associated with the communication service. In some embodiments, multiple communication paths 112 may be supported by one port 110 of the router 104. In another embodiment, depending on the communication volume associated with the communication service, multiple communication paths 112 may be supported by two or more ports 110 of the router 104.

The CPE 102 is located in the customer network 103 and may comprise a gateway, a router, a hub, a modem, or other device for promoting data communications. The CPE 102 may be linked to a local area network (LAN) (not shown) in the customer network 103 that connects a plurality of computers within the customer network 103. The CPE 102 may provide devices or computers communicatively coupled to the CPE 102 with access to the network 106 via the communication service. In another embodiment, however, the CPE 102 may be different from the above described exemplary configuration.

A graphical user interface (GUI) 130 provides a user (e.g., a customer, a service provider administrator, or both) access to a troubleshooting tool 132. The GUI 130 may be used to access the troubleshooting tool 132 from the customer network 103, the service provider network 105, or any network 106. The GUI 130 may be presented on a display linked to a variety of computers and work stations in the customer network 103. In an embodiment, the GUI 130 may provide one or more buttons that allow the user to select an input (e.g., an asynchronous JAVASCRIPT request (AJAX)) to be sent to the troubleshooting tool 132 via the communication links, for example, from the computer presenting the GUI 130 over a LAN communication link to the CPE 102, over the communication path 112 to the port 110 of the router 104, over link 114 to the network 106, and via the network 106 to the web server 134 hosting the troubleshooting tool 132. The AJAX message may include one or more queries related to the status of the communication service, the CPE 102, the communication path 112, the router 104, the port 110, or a combination thereof. For example, the status queries may include an interface status query, a QoS status query, a connectivity status query, a latency query, and other status queries. Based on the response to these status queries, the customer may obtain a transparent view into the communication service that enables them to verify, maintain, and troubleshoot the communication service. Furthermore, access to troubleshooting tool 132 via GUI 130 is not limited to customers from a customer network. In an embodiment, customer and service provider administrators may utilize troubleshooting tool 132. In an embodiment, GUI 130 may be similarly provided to a network provider for accessing the troubleshooting tool 132 from the service provider network 105. In yet another embodiment, GUI 130 may be provided in any network 106 to allow a customer, a service provider administrator, or both to access the troubleshooting tool 132.

In an embodiment, key operational parameters or information related to the communication path 112, the router 104, and/or the port 110 may be displayed highlighted, bolded, or otherwise emphasized in the GUI 130 to aid in assimilating the information provided. However, these status queries are uni-directional. That is, the status queries initiated at the GUI 130 may collect information with respect to the communication path 112, the router 104, and/or the port 110 associated with a communication service from the perspective of the service provider's interface. Alternatively, the status queries initiated at the GUI 130 may collect key operational parameters or information related to the communication service based on queries made to the CPE 102 on the customer network side. However, because a communication path has at least two endpoints and the information collected by the status queries is associated with only one end of the communication path, that is, either from the customer side or the service provider side, the information may be considered to be uni-directional.

In an embodiment, the uni-directional information of key operational parameters or information related to the communication path 112, the router 104, the port 110, the CPE 102, or a combination thereof may be stored on the datastore 101. The uni-directional information stored in datastore 101 in relation to a status query may be referred to as uni-directional status query information. For example, uni-directional status query information may include the time of the status query, any user comments provided via the GUI 130, and the scope of the status query (e.g., identification of the customer, the CPE 102, the communication path 112, the router 104, the port 110, the communication path 112, or a combination thereof).

The troubleshooting tool 132 is provided to collect and analyze bi-directional information, that is, information associated with both the customer side and the service provider side. This bi-directional information may be measured or collected in real-time, that is, the information is measured or collected from data traffic as the data traffic is being transmitted or received, and analyzed as soon as possible after the information is collected for both sides. Said in another way, the term real-time as used herein means that the information is measured, collected, transmitted, and analyzed as events happen versus performing one or more of these actions in a batch processing mode of operation. In an embodiment, real-time measurement, collection, transmission, and analysis of information related to an event may take place in less than 10 seconds, in less than one minute, in less than five minutes, or in less than fifteen minutes. The bi-directional information collected may be in the form of operational parameters, measurements, network conditions (e.g., full or partial outage, bottleneck, bandwidth, equipment integrity, traffic, all of the previous at a specific point or interval in time, or a combination thereof).

For instance, the troubleshooting tool 132 may execute on a computer system in the service provider network 105 and may send a simple network management protocol (SNMP) message to the CPE 102, the router 104, and/or to the port 110 to request appropriate data (e.g., measurements, operational parameters, network conditions, or a combination thereof) automatically, or in reply or response to one or more of the status queries discussed hereinabove. Additionally or alternatively, the troubleshooting tool 132 may execute on a computer system in the service provider network 105 and may send a simple network management protocol (SNMP) message to the router 104 and/or to the port 110 to request appropriate data (e.g., measurements, operational parameters, network conditions, or a combination thereof) automatically, for example, according to one or more predetermined conditions (e.g., time, a threshold trigger regarding system parameters, a network outage, or a combination thereof). The SNMP message may request current values of operational parameters or measurements of the performance of the communication service at the CPE 102, the router 104, and/or the port 110, for example a current queue depth, an average queue depth, a maximum queue depth, an offered throughput rate, a packet drop rate, incoming packet rate, number of incoming packets, outgoing packet rate, number of outgoing packets, and other parameters. Additionally, the SNMP message may request current values of a variety of counters, for example an input error counter, an output error counter, an input packet discard counter, an output packet discard counter, an interface resets counter, a carrier transitions counter, and other well-known counters. The process of obtaining values of counters and operational parameters of the router 104 and/or the port 110 may be referred to as polling the router 104 and may be accomplished by using the SNMP protocol or by another method. Other methods of obtaining the operational information from the router 104 and/or the port 110 are contemplated by this disclosure. In an embodiment, the troubleshooting tool 132 may interact or interface with other platforms to initiate tests and/or collect measurement from the other platforms to use while troubleshooting a communication service.

The collected parameters and measurements may be used for analyzing a communication path 112 bi-directionally. In an embodiment, the parameters and/or measurements may first be collected from each side of the communication path 112 by the troubleshooting tool 132, that is, from both the CPE 102 on the customer side of the communication path 112 and router 104 on the service provider side of the communication path 112. The measurements may be collected over a certain period of time, e.g. the number of packets dropped or the number of packets received in the last five minutes. Because collection of the measurements at CPE 102 is independent of collection of measurements at router 104, the five minute interval for CPE 102 may have a different start time and stop time than the five minute interval at router 104. For example, the five minute time interval may be a sliding window.

A CPE 102 may be managed or unmanaged by the service provider. In an embodiment, the service provider may initiate bi-lateral troubleshooting by identifying either a managed CPE 102 or port 110. In an embodiment, the device ID of managed CPE 102 may be selected first. After the device ID of managed CPE 102 is selected, the port ID 110 of router 104 may be readily available from the service provider's configuration information. In another embodiment, a port ID 110 of router 104 may be selected first. The device ID of managed CPE 102 may be readily available from the service provider's configuration information for that site. The CPE 102 may also be identified by an IP address, device name, or other information configured by the service provider that may identify the managed device CPE 102.

In an embodiment, after the CPE 102 and port 110 are selected, the troubleshooting tool 132 may perform status queries on each of the CPE 102 interface and the router 104 interface. The information collected from the CPE 102 interface and port 110 interface may then be analyzed bi-directionally on a real-time basis. By performing a bi-directional analysis, the service provider may be able to detect issues or problems with the site that may not be gleaned from looking at either CPE 102 or port 110 individually. In an embodiment, a problem with the performance of the communication service may be associated with a mismatch of configuration parameters between CPE 102 and port 110. In another embodiment, the analysis may reveal that the configuration information is correct and the communication service is performing as intended.

In an embodiment, the system 100 (e.g., the troubleshooting tool 132) may automatically highlight the problem, open a trouble ticket, or both. Alternatively, the system 100 may send an offer to open a trouble ticket (e.g., via the GUI 130) to the user (e.g., customer or service provider). Offering to open a trouble ticket may give the user (e.g., a customer) the opportunity to provide important and/or useful information. The offer may include and display any of the bi-directional information to the user via the GUI 130. The offer may include and display a comment field in the GUI 130 for user input of any comments. The user may then choose to accept or reject the offer. For example, the user may utilize the GUI 130 to select one or more buttons that allows the user to accept or reject the offer. If the system 100 receives an acceptance of the offer, then the system 100 may open a trouble ticket. Upon opening a trouble ticket, the system 100 may bundle, populate, or otherwise associate the trouble ticket with the bi-directional information to create a populated trouble ticket. The system 100 may then present the populated trouble ticket to the user with a comment field in the GUI 130 for any comments the user may want to input. If the system 100 receives a rejection of the offer to open a trouble ticket, then the system 100 may not open a trouble ticket and may proceed with information storage, linkage, or both as described herein.

In an embodiment, a trouble ticket which is opened (as well as a populated trouble ticket) may be stored in the datastore 101. The trouble ticket may include the time the trouble ticket was opened, identifying information for the user that opened the trouble ticket, identifying information of components of the system 100 that may be suspected as having an issue, or a combination thereof.

In an embodiment, any of the bi-directional information described herein for the system 100 may be stored in the datastore 101, including but not limited to any operational parameters and measurements (e.g., CPE measurements, router measurements, or both), test results, whether a problem is detected, an identification of the problem, a cause (possible or actual) of the problem, one or more solutions to the problem, whether a trouble ticket was opened, whether a trouble ticket was offered to the user, the type of equipment of the CPE 102, the type of equipment of the router 104, a syntax used by the equipment of the CPE 102 to describe CPE protocol settings, the syntax used by the equipment of the router 104 to describe router protocol settings, or a combination thereof.

In embodiments, customer behavior may also be stored in the datastore 101. For example, customer behavior may include whether the customer accepted an offer to open a trouble ticket, whether the customer rejected an offer to open a trouble ticket, a status query made by the customer, any comments provided in the status query by the customer, the number of status queries made by the customer, the frequency of status queries made by the customer, the number and/or frequency of acceptance of an offer to open a trouble ticket, any comments provided in the trouble ticket or populated trouble ticket, any comments provided in current information linked with previously stored information (discussed below), the number and or frequency of rejection of an offer to open a trouble ticket, a correlation between the number and/or frequency of status queries made by the customer and the possible or actual existence of a problem, a time stamp and identification of any action taken by the customer, or a combination thereof. The customer behavior may be associated with the corresponding bi-directional information, uni-directional information, trouble ticket, or a combination thereof before or after storage in the datastore 101.

The system 100 may link a trouble ticket, populated trouble ticket, uni-directional information, bi-directional information, customer behavior, or a combination thereof (for purposes of discussion, collectively referred to as "current information") with a previously stored trouble ticket, previously stored populated trouble ticket, a previously stored bi-directional information, a previously stored uni-directional information, a previously stored customer behavior, or a combination thereof (for purposes of discussion, collectively referred to as "previously stored information"). In order to link the current information with the previously stored information, the system 100 may retrieve the previously stored information from the datastore 101 and link said previously stored information to current information such that, upon later retrieval of the stored current information, the system 100 also provides access to the previously stored information.

In an embodiment, the system 100 may present the current information and linked previously stored information to the user (e.g., via GUI 130). A comment field may be provided on the GUI 130 for the user to enter and submit any comments to the system 100. The system 100 may link and store (e.g., in the datastore 101) the comments with the trouble ticket and linked uni-directional information, bi-directional information, customer behavior, or a combination thereof.

Figure 2:
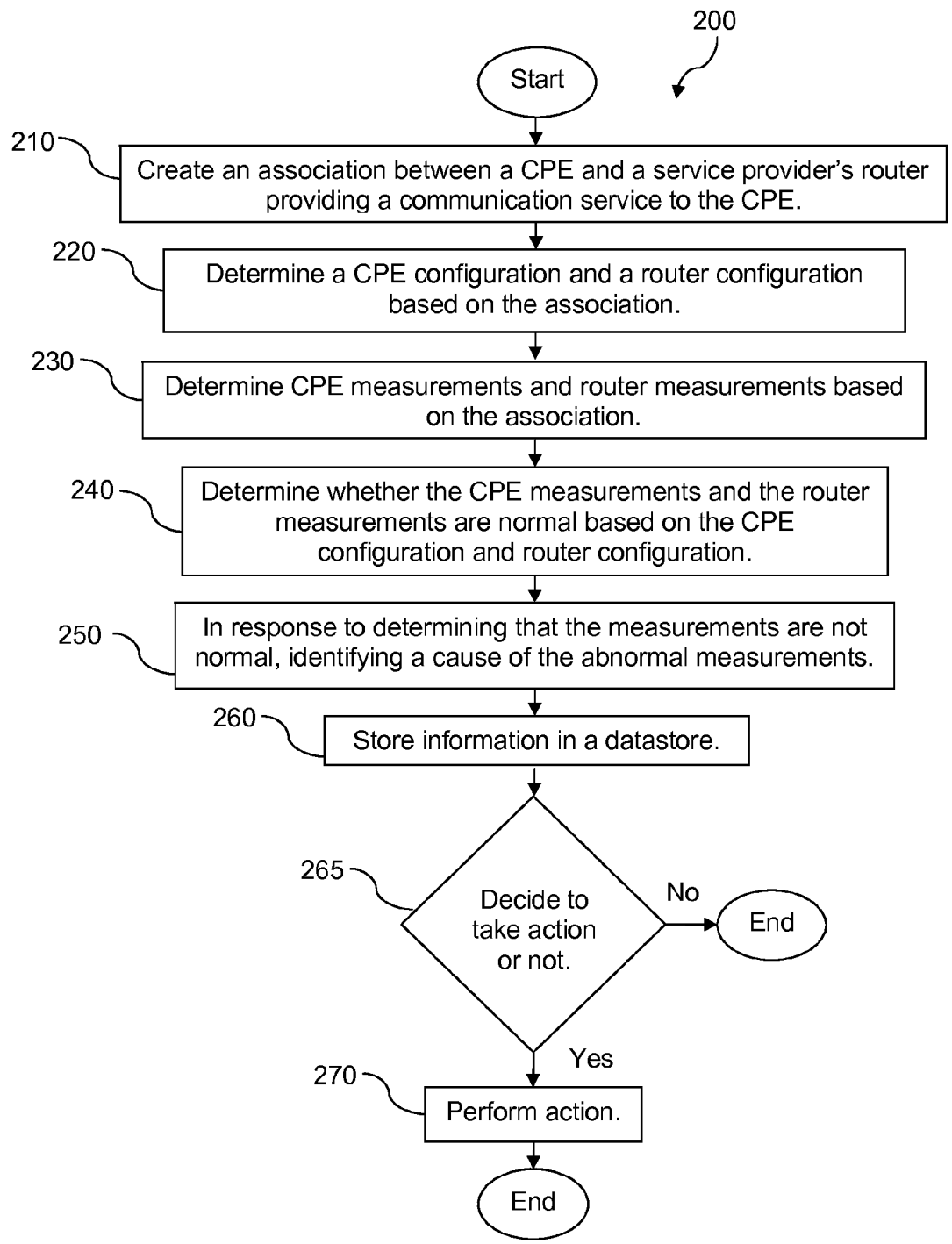
FIG. 2 illustrates an exemplary method for troubleshooting a communication service.

Turning now to FIG. 2, a flow chart of exemplary method 200 for troubleshooting a communication service is described. The method 200 begins at block 210 where an association is created between customer premises equipment (CPE) 102 and a communication service provider router 104 providing the communication service. In an embodiment, the association is created between devices comprising a site. In an embodiment, the association is created between a device ID of CPE 102 and a port 110 of router 104. It is contemplated, however, that an association may be created between two devices based on any information that identifies the two devices comprising a customer site or otherwise identifies the two endpoints of a communication path providing a communication service. In another embodiment, an association may be created between two customer sites of the customer's wide area network (WAN) using information that identifies one or more customer sites.

In block 220, the method 200 determines a CPE configuration of the CPE in the customer network. The method 200 also determines a router configuration of the communication service provider router providing communication services to the CPE based on the association. The CPE configuration and the router configuration identify configuration settings established by the communication service provider when the customer subscribed to the communication service. The configuration settings may be set according to a service level agreement (SLA) agreed upon when the customer subscribed to the communication service. Configuration settings associated with an SLA may be communication service dependent and may include an IP subnet address, Point-to-Point (PPP) multilink fragmentation information, encapsulation type, class of service, interface scrambling parameter for a serial interface, or any other information configured by the service provider to provide a communication service to the customer.

In an embodiment, the configuration settings for the CPE 102 may desirably match the configuration settings for port 110. Thus, after the configuration settings are determined for each side, the method 200 compares each parameter of the CPE configuration against the corresponding parameter of the router configuration to determine whether the communication path between the two interfaces has been configured to perform as specified in the SLA. For example, configuration parameters for multilink fragmentation, encapsulation type, class of service, and interface scrambling at CPE 102 may desirably match the configuration parameters for multilink fragmentation, encapsulation type, class of service, and interface scrambling at port 110 of the service provider router 104. Generally, these parameters may relate to how data is formatted and transmitted between CPE 102 and router 104 and if there is a mismatch between the CPE 102 configuration and the router 104 configuration, the performance of the communication service may be hindered. In an embodiment, the equipment type and/or configuration settings for the CPE 102 and the equipment type and/or configuration settings for the router 104 may have different syntax and/or equipment type, yet the CPE 102 and router 104 configuration settings are determined to be matching. For example, the CPE 102 may be a first type(s) of equipment which is not the same type of equipment as the router 104, and the first type(s) of equipment of the CPE 102 may utilize a syntax to describe configuration settings which is different than the syntax utilized by the router 104 to describe configuration settings. The method 200 may include one or more steps which, upon determining the CPE 102 and router 104 equipment type, the CPE 102 and router 104 syntaxes, or both, are not the same, determine the different or dissimilar equipment types, syntaxes, or both are matching. Different or dissimilar equipment types and different or dissimilar syntaxes which match may be stored as all or part of the bi-directional information in datastore 101. The stored equipment types and syntaxes which are different or dissimilar (and yet matching) may be retrieved when troubleshooting to identify whether a customer premises equipment and router which are subject to the troubleshooting have matching (but different or dissimilar) equipment types, matching (but different or dissimilar) syntaxes, or both. The disclosed embodiments are thus able to determine seemingly different or dissimilar customer premises equipment and router equipment types and syntaxes are matching not only by determining the different or dissimilar equipment types and syntaxes are matching on a first encounter of a given equipment type or syntax, but by storing and maintaining a body of data in datastore 101 which can be retrieved to determine a customer premises equipment and router which are subject to troubleshooting have different or dissimilar equipment types and/or syntaxes which have previously been determined to be matching.

For certain other configuration settings, the parameters may not need to match exactly, but they may desirably meet certain criteria (e.g., fall within an acceptable range, meet an acceptable tolerance, etc.). For example, the method 200 may determine a CPE parameter of the CPE 102 falls within an acceptable range of values which are stored in and retrieved from the datastore 101 for analysis of the CPE parameter, the method 200 may determine a router parameter of the router 104 falls within an acceptable range of values which are stored in and retrieved from the datastore 101 for analysis of the router parameter. The configuration information may also be associated with a particular interface type. In an embodiment, for an Ethernet interface, the configuration of duplex transmission settings or virtual local area network (VLAN) settings may also be verified to be set appropriately for the communication service to perform properly over communication path 112.

In an embodiment, an IP address designated in the CPE 102 configuration and the IP address designated in the router 104 configuration may not match, however, the IP addresses should be in the same subnet. In an embodiment, the IP address of CPE 102 and the corresponding IP address of port 110 may be one number off. Even though the IP addresses do no match, this is an acceptable configuration as long as the IP addresses are configured within the same subnet mask. The configuration of IP addresses at the CPE 102 and router 104 provides an example of when matching parameters in the CPE configuration and the router configuration may be problematic. In another embodiment, the configuration parameters may be verified prior to creating an association.

In block 230, the method 200 determines CPE measurements associated with CPE 102 and router measurements associated with the router 104 based on the association. These measurements may also be referred to as performance metrics or performance reports. Measurements may be taken by CPE 102 and router 104 related to a communication service. Measurements may be collected in the normal course of the device functionality and performance reports may be generated accordingly. The performance reports may be collected as needed.

Measurements may be interface-dependent. In an embodiment, a radio frequency (RF) signal strength may be measured on a wireless interface of communication path 112, whereas RF signal strength may not be an appropriate measurement on an Ethernet interface. In an embodiment, the troubleshooting tool 132 may determine the interface type prior to running a particular test or collecting a particular measurement.

In an embodiment, measurements may be taken on initiation of a command directed to collecting measurements related to an aspect of a communication service. Simple Network Management Protocol (SNMP) commands, ping commands, or other commands that initiate testing or measurement of activity over a communication path in real-time may be invoked to test the communication path and/or collect measurement reports. Measurements may be collected over a period of time. In an embodiment, a measurement report may contain information collected regarding the number of bytes sent by one side of the association and received by the other side of the association during a time interval.

In other embodiments, simultaneous tests are initiated toward both sides, or interfaces, of the communication path. In an embodiment, a command may be initiated that generates traffic from or to the interfaces to be tested and collects measurements associated with that test. In an embodiment, the traffic is generated on both sides of communication path 112 at the same time. Whether to generate traffic on one or both sides of communication path 112 may be an optional testing parameter which may be selected before running a test. Troubleshooting tool 132 is not limited to merely observing or collecting results of a test. In an embodiment, troubleshooting tool 132 may allow manipulation of various test parameters and/or data associated with a test prior to running the test. In an embodiment, the bit pattern of a ping test may be manipulated in order to test a particular aspect of an interface of a communication path. In another embodiment, traffic generated toward either one or both interfaces of a communication path may be manipulated with a particular class of service or quality of service to test various traffic handling queues.

In block 240, the method 200 determines whether the CPE measurements and the router measurements collected in block 230 are normal based on the CPE configuration and the router configuration for the communication service. Measurements may be considered normal if communication service is performing at an acceptable level for the service as configured, and when the service is configured properly. In an embodiment, a number of bytes sent from CPE 102 may be compared with the number of bytes received and processed by router 104. In an embodiment, the method 200 may determine that the number of bytes sent from CPE 102 may not equal the number of bytes received and processed by router 104. However, the communication service may be performing normally if the difference in the number of bytes sent by CPE 102 and the number of bytes received and processed by router 104 is within a certain threshold. In an embodiment, a reason for the difference may be because the interval during which the measurements were collected occurred in different time windows at the CPE 102 than at router 104. In another embodiment, the measurements may indicate that an input rate at the incoming side is 141 K bits per second (bps) and the output from the transmitting side is 155K bps. However, those measurements may be within an acceptable margin of error between two independent devices.

In an embodiment, the method 200 may contain a set of rules to apply for comparing the CPE measurements and the router measurements and determining whether the measurements are normal in light of the association created between CPE 102 and router 104. In some instances, a customer may perceive a problem with the performance of the communication service even when the performance is in-line with the SLA for the communication service. In an embodiment, the router 104 may drop packets because the customer requested that traffic from CPE 102 be treated with a particular class of service (CoS) for a particular communication service. In another embodiment, other types of measurements may be compared to determine if the measurements are equal and if the measurements are not equal and further determine if the differences meet the requirements of the SLA, that is, if the measurements are normal. Determining if the requirements of the SLA are being met may include applying the set of rules for troubleshooting a particular communication service.

In yet other embodiments, certain configuration parameters may direct the focus of the troubleshooting. In an embodiment, if the configuration of router indicates multilink, the configuration of the CPE 102 may be immediately checked to determine whether it is also configured for multilink. Similar rules may be defined for other configuration parameters which are required to match at both sides. In an embodiment, a priority may be applied to the order in which the configuration parameters are checked and analyzed. Similarly, a priority may be applied to the tests that are initiated to generate traffic and/or collect measurements from the CPE 102 interface and the service provider interface of communication path 112.

In another embodiment, the method 200 may determine that the CPE measurements and router measurements are not normal in light of the association. For example, the difference between certain CPE measurements and the router measurements may exceed a defined threshold. Steps 230 and 240 may be performed iteratively until a problem is identified or until it is determined that the communication service is configured and performing properly in accordance with an SLA. In an embodiment, the results of a test may either be determined to be normal in view of the configuration parameters that are properly configured. In an embodiment, the set of rules may identify a next configuration parameter to verify and/or a next test to initiate. In an embodiment, the next set of test results may be similarly analyzed. The priority applied to certain tests or configuration parameters may be assigned in the set of rules based on the most common network problems encountered, the communication service being tested, the type of interface, or any other criteria which may be relevant to troubleshooting the communication service.

In block 250, in response to the method 200 determining that the CPE measurements and the router measurements are abnormal, the method 200 identifies a cause of the abnormal measurements. In an embodiment, identifying the cause of abnormal measurements may include identifying a configuration mismatch between the CPE configuration and the router configuration. In an embodiment, if router 104 is determined to be dropping an amount of bytes, or packets, from the CPE 102 at an abnormal rate for the class of service defined in the SLA, the method 200 identifies a cause of the abnormal measurements. In an embodiment, the method 200 identifies possible causes of the difference between the number of packets sent from CPE 102 and the number of bytes received and processed at router 104. In an embodiment, the analysis includes examining the resource configuration at the router 104 where the packets are being dropped, identify the queue dropping the packets, and determine whether the queue handling those packets is configured correctly. In an embodiment, the customer may mark packets with a precedence to indicate the class of service handling for the packets. In an embodiment, the troubleshooting analysis may determine that the queue type is configured with a class of service different than the precedence in the marked packets. The mismatch may have resulted in more traffic to be dropped than the class of service indicated in the SLA or for the customer to merely perceive that more traffic was dropped than anticipated. When a mismatch or other cause is identified, the method 200 may then automatically highlight the problem, open a trouble ticket, or both. Alternatively, the method 200 may send an offer via the GUI 130 described in FIG. 1 to the user. The user may then choose to accept or reject the offer. If the offer is accepted, then the method 200 may proceed to open a trouble ticket. For example, the user may utilize the GUI 130 to select one or more buttons that allows the user to accept or reject the offer. The method 200 may then receive the acceptance and open the trouble ticket or a rejection and not open the trouble ticket. Once a trouble ticket is opened, the method 200 may bundle, populate, or otherwise associate the trouble ticket with the bi-directional information to create a populated trouble ticket. The method 200 may then present the populated trouble ticket to the user with a comment field in the GUI 130 for any comments the user may want to input.

In block 260, the method 200 may store information in datastore 101. The information that may be stored in datastore 101 include any information disclosed herein, including the trouble ticket (e.g., the populated trouble ticket), any of the bi-directional information collected, any customer behavior collected, or a combination thereof. In embodiments, the method 200 may link the current information with the previously stored information. In order to link the current information with the previously stored information, the method 200 may retrieve the previously stored information from the datastore 101 and link said previously stored information to current information such that, later retrieval of the stored current information provides access to the previously stored information in addition to access to the stored current information. In an embodiment, the method 200 may present (e.g., via the GUI 130) the current information, the previously stored information, or both to the user. Further, the method 200 may provide a comment field on the GUI 130 such that the user may enter comments, and the method 200 links or associates the comments with the current information, previously stored information, or both.

In decision block 265, the communication service provider may determine to take an action or not to take an action. Data and/or information stored in the datastore 101 of the communication service provider may be used to determine whether to take action or not. The decision or whether to take an action or not may be based on: i) the cause of the problem (e.g., a difference in configurations), and ii) a comparison of the cause and/or obtained information (e.g., bi-directional information) to the same or similar problems and/or solutions which were previously stored on datastore 101 and are retrievably stored on the datastore 101. For example, the communication service provider may decide to take an action, or not to take an action, based on: i) the cause of the problem, and ii) a solution for the cause which is obtained by comparing the cause, the customer premises equipment configuration, the router configuration, or a combination thereof with any of the information and/or data disclosed herein which has been previously stored on the datastore of the communication service provider. The decision may be automatically made by the communication service troubleshooting tool 132, or the decision may be made by personnel of the communication service provider.

In block 270, in embodiments where the communication service provider decides to take an action, the service provider may perform an action. Examples of actions which may be taken include a proactive outreach to the customer, a proactive effort to fix the problem or cause of the problem, initiating monitoring all or a part of the communication service, initiating monitoring the customer behavior, changing or adjusting an aspect of monitoring all or a part of the communication service and/or customer behavior (e.g., frequency, monitoring type, target equipment, or a combination thereof), changing a customer premises equipment configuration to an acceptable customer premises equipment configuration, changing a router configuration to an acceptable router configuration, or a combination thereof. Performance of the action may be accomplished by personnel of the communication service provider, automatically by the disclosed tool 132, or a combination thereof. For example, the service provider may allocate personnel to quickly correct the identified cause of the problem. Personnel may use the data and/or information stored in the datastore 101 of the communication service provider to implement a solution to the cause of the problem. Alternatively, the communication service troubleshooting tool 132 may automatically implement a solution. The solution chosen may be based on: i) the cause of the problem (e.g., a difference in configurations), and ii) a comparison of the cause and/or obtained information (e.g., bi-directional information) to the same or similar problems and/or solutions which were previously stored on datastore 101 and are retrievably stored on the datastore 101. For example, solution chosen may be based on: i) the cause of the problem, and ii) a solution for the cause which is obtained by comparing the cause, the customer premises equipment configuration, the router configuration, or a combination thereof with any of the information and/or data disclosed herein which has been previously stored on the datastore of the communication service provider.

Figure 3:
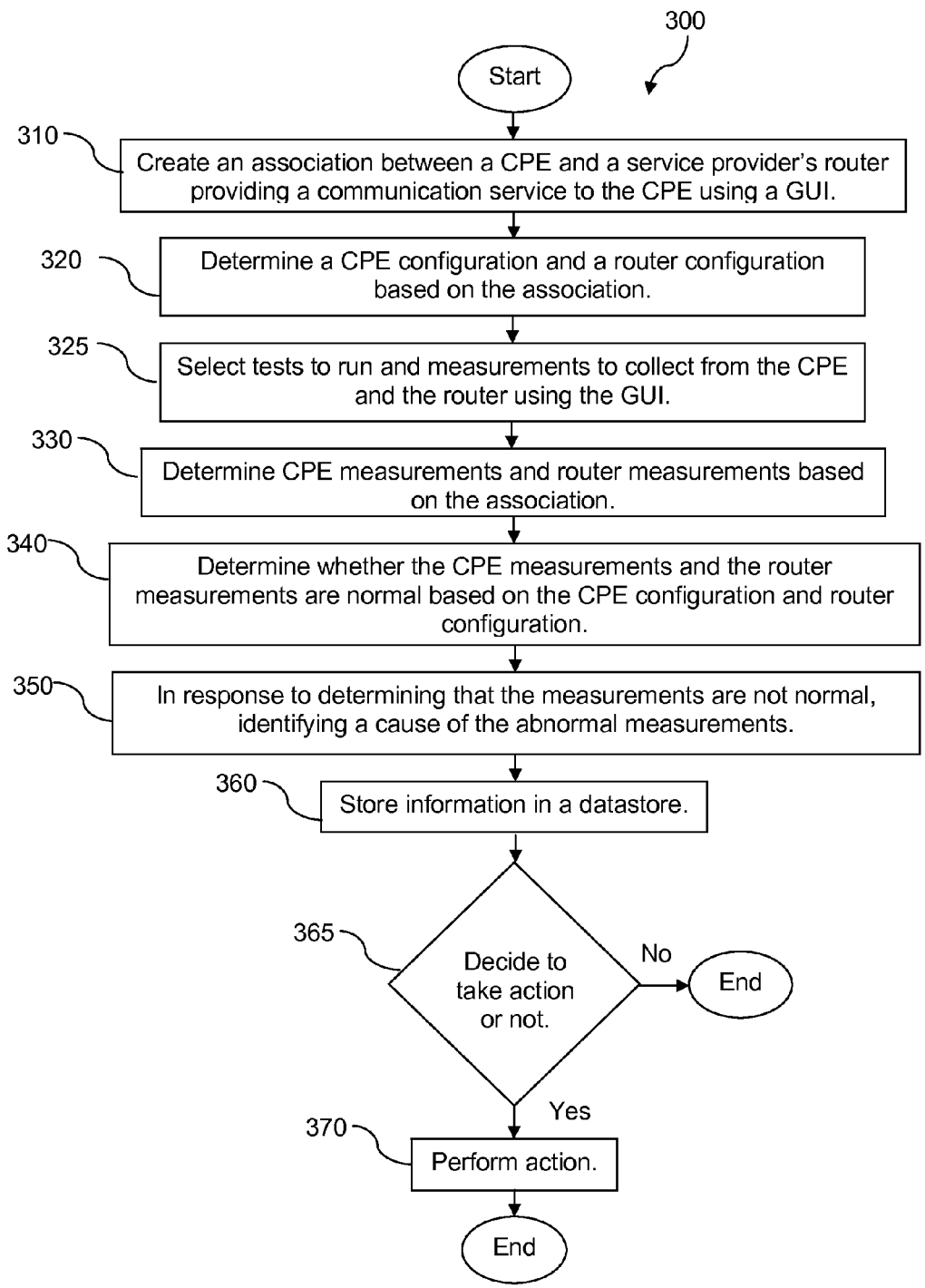
FIG. 3 illustrates an exemplary troubleshooting tool for troubleshooting a customer network.

Turning now to FIG. 3, a flowchart 300 for a communication service troubleshooting tool 132 is described. The troubleshooting tool 132 performs the steps as described in method 200 steps 210-250. In block 310, the troubleshooting tool 132 performs the step of creating an association between the CPE and the service provider based on a communication service. The creation of an association may be initiated by selecting, at a GUI, an identifier for CPE 102 and/or port 110 to identify the two endpoints. If CPE 102 is a managed device, then the troubleshooting tool 132 may determine the second endpoint automatically after the first endpoint is selected. Either the customer endpoint or the service provider endpoint may be selected as the first endpoint. In block 320, the troubleshooting tool 132 determines a CPE configuration of the CPE in the customer network and a router configuration of the router in the communication service provider network providing communication services to the CPE, based on the association.

In an embodiment, at step 325, the customer or service provider may use a GUI to select the types of tests to run and the measurements to collect from the two endpoints in the association. In step 330, the troubleshooting tool 132 determines CPE measurements associated with the CPE and router measurements associated with the router, based on the association. In an embodiment, the CPE measurement and router measurements are determined by initiating the tests selected in block 325. In another embodiment, the test initiated may be selected automatically according to the communication service, the value of a configuration parameter, or other information according to the SLA. The troubleshooting tool 132 then automatically performs the tests for both endpoints and collects performance metrics and generates measurement reports.

In block 340, the troubleshooting tool 132 determines whether the CPE measurements and the router measurements are normal based on the CPE configuration and the router configuration. In block 350, in response to determining that the CPE measurements and the router measurements are abnormal, a cause of the abnormal measurements is identified. In an embodiment, the troubleshooting tool 132 may automatically highlight the problem and open a trouble ticket indicating the problem, the cause of the problem, and a solution based on the determined cause. Alternatively, the troubleshooting tool 132 may send an offer to open a trouble ticket, and then proceed to open a trouble ticket upon acceptance of the offer. Once a trouble ticket is opened, the troubleshooting tool 132 may bundle, populate, or otherwise associate the trouble ticket with the bi-directional information disclosed herein to create a populated trouble ticket. The troubleshooting tool 132 may then present the populated trouble ticket to the user with a comment field in the GUI 130 for any comments the user may want to input. The service provider may then allocate personnel to quickly correct the identified cause of the problem.

In block 360, the troubleshooting tool 132 may store information in the datastore 101. Information which may be stored includes the trouble ticket (e.g., populated trouble ticket), any of the bi-directional information collected, customer behavior, or a combination thereof. In an embodiment, the troubleshooting tool 132 may link the current information with the previously stored information. In order to link the current information with the previously stored information, the troubleshooting tool 132 may retrieve the previously stored information from the datastore 101 and link said previously stored information to current information such that, later retrieval of the stored current information provides access to the previously stored information in addition to access to the stored current information. In an embodiment, the troubleshooting tool 132 may present, (e.g., via the GUI 130), the current information, the previously stored information, or both to the user. Further, the troubleshooting tool 132 may provide a comment field on the GUI 130 such that the user may enter comments, and the troubleshooting tool 132 may link or associate the comments with the current information, previously stored information, or both.

In decision block 365, the communication service provider may determine to take an action or not to take an action in the same manner as describe for decision block 265 of FIG. 3.

In block 370, in embodiments where the communication service provider decides to take an action, the service provider may perform an action in the same manner as described for block 270 of FIG. 2.

While embodiments herein have been described generally with respect to troubleshooting a communication path between CPE 102 and port 110 of the service provider's router 104, the troubleshooting tool 132 is not so limited. The troubleshooting tool 132 is contemplated for use to troubleshoot problems between any two endpoints of a communication path. In an embodiment, the endpoints may be a managed CPE and a service provider router, or even a port on the service provider's router, also referred to as a "site". In another embodiment the endpoints may be a non-managed CPE and a service provider router or port. In yet another embodiment, the endpoints may be two different customer sites with a customer wide area network (WAN). A customer WAN may have a site in one geographic location, e.g. Atlanta, and another site in another geographic location, e.g. Orlando. The customer may perceive a problem with the performance of a communication service between the two sites. In an embodiment, the troubleshooting tool 132 may determine the configurations and collect measurements for both sites, then perform analysis of the measurements of the two sites. The troubleshooting tool 132 applies a set of rules, which may be different than the set of rules for troubleshooting one site, to determine if the communication service between the two sites is performing normally or not. If the communication service between the two sites is not performing normally or as expected, the troubleshooting tool 132 may perform analysis to identify a cause for the problem and take corrective action, such as offering to open a trouble ticket, issuing a trouble ticket, allocating personnel to address the identified problem, or a combination thereof.

As described with respect to FIG. 1, the troubleshooting tool 132 further comprises a graphical user interface (GUI) 130. The service provider may initiate troubleshooting a site or communication path 112 between two endpoints. For example, the service provider may select the first endpoint of CPE 102 and the second endpoint of port 110 by selecting at least one end of the communication path 112 at the GUI 130. If the device is a managed CPE, the service provider may only need to select one endpoint and the troubleshooting tool 132 may automatically determine the second endpoint. In another embodiment, the service provider may select the two endpoints for troubleshooting. The troubleshooting tool 132 then creates an association for the two endpoints. The troubleshooting tool 132 may automatically determine the configuration information for the two endpoints, and when the results are abnormal, reports the problem identified by opening a trouble ticket, for example.

In an embodiment, a customer may access the troubleshooting tool 132 via the service provider's customer portal. If the CPE is non-managed, the customer may initiate a troubleshooting session for just the customer side of the communication path 112. If the CPE is a managed device, the customer may initiate a troubleshooting session on both sides of a communication path 112. In an embodiment, the customer may view how services are configured on port 110 of service provider's router 104 regardless of whether the CPE is managed or non-managed. If the CPE is a managed device, the customer may be provided a of view the configuration of the service provider's entire router 104.

Figure 4:
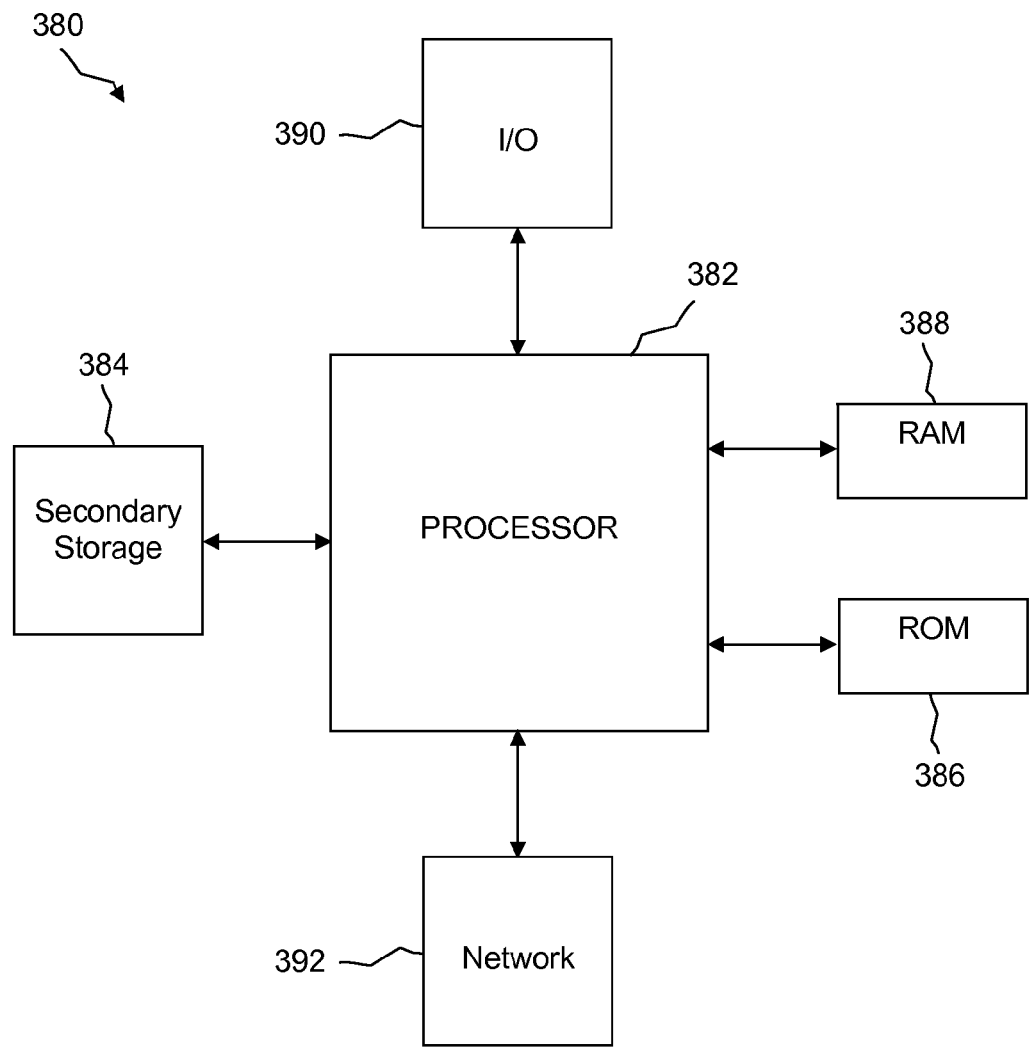
FIG. 4 illustrates an exemplary computer system suitable for implementing the several embodiments of the disclosure.

Some portions of the system 100 described above may be implemented on any computer with sufficient processing power, memory resources, and network throughput capability to handle the necessary workload placed upon it. FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for bi-lateral data connection troubleshooting a communication service by using a communication service troubleshooting tool, comprising:

creating, by the communication service troubleshooting tool, an association between a customer premise equipment in a customer network and a communication service provider router providing the communication service in a communication service provider network;

determining, by the communication service troubleshooting tool, a customer premise equipment configuration of the customer premise equipment in the customer network and a router configuration of the communication service provider router providing communication services to the customer premise equipment based on the association;

responsive to determining the customer premise equipment configuration and router configuration, initiating, by the communication service troubleshooting tool, at least one network test on a customer premise equipment interface of the customer premise equipment in the customer network and at least one network test on a router interface of the communication service provider router, each of the at least one network tests are separate and initiated simultaneously, wherein the customer premise equipment interface and the router interface are configured for the communication service;

responsive to initiating the separate tests, generating customer premise equipment measurements based on the at least one network test on the customer premise equipment interface and router measurements based on the at least one network test on the router interface;

collecting, by the communication service troubleshooting tool, the customer premise equipment measurements and the router measurements generated by each of the at least one test initiated on the customer premise equipment interface and the at least one test initiated on the router interface;

determining, by the communication service troubleshooting tool, a difference between the collected customer premise equipment measurements and router measurements;

determining, by the communication service troubleshooting tool, whether the difference exceeds a normal threshold;

in response to determining that the difference exceeds the normal threshold, identifying, by the communication service troubleshooting tool, that a cause of the difference includes at least a mismatch between the customer premise equipment configuration and the router configuration; and changing, by the communication service troubleshooting tool, at least one of the customer premise equipment configuration to an acceptable customer premise equipment configuration or the router configuration to an acceptable router configuration based on i) the cause of the difference, and ii) a solution for the cause which is obtained by comparing the cause, the customer premise equipment configuration, the router configuration, or a combination thereof with information previously stored on a datastore of the communication service provider, wherein the information previously stored comprises a previously stored cause, previously stored bi-directional information, previously stored customer behavior, or a combination thereof.

2. The method of claim 1, further comprising:
monitoring the customer behavior regarding the bi-lateral data connection; and
storing the customer behavior in the datastore.

3. The method of claim 1, further comprising:
opening a trouble ticket;
populating the trouble ticket with the bi-directional information to create a populated trouble ticket; and
storing the populated trouble ticket in the datastore.

4. The method of claim 3, further comprising:
presenting the populated trouble ticket to a user;
receiving a comment from the user regarding the populated trouble ticket; and
storing the comment regarding the populated trouble ticket in the datastore.

5. The method of claim 3, further comprising:
linking the populated trouble ticket with a customer behavior, a previously stored trouble ticket, the previously stored bi-directional information, the previously stored customer behavior, a previously stored uni-directional information, or a combination thereof.

6. The method of claim 3, further comprising:
sending an offer to open a trouble ticket to a user;
receiving an acceptance of the offer to open a trouble ticket from the user; and
storing the acceptance in the datastore.

7. The method of claim 3, wherein opening a trouble ticket comprises:
automatically opening a trouble ticket upon the occurrence of a trigger condition.

8. A communication service troubleshooting tool for bi-lateral data connection troubleshooting of communication services, comprising instructions stored in non-transitory memory that, upon execution by at least one processor, configure the at least one processor to:

create an association between a customer premise equipment and a communication service provider router;

determine a customer premise equipment configuration of the customer premise equipment in a customer network and a router configuration of the communication service provider router in a communication service provider network providing communication services to the customer premise equipment based on the association;

responsive to determination of the customer premise equipment configuration and the router configuration, initiate at least one network test on the customer premise equipment and at least one network test on the communication service provider router, each of the at least one network tests are separate and initiated simultaneously, wherein the at least one network test on the customer premise equipment generates customer premise equipment measurements and the at least one network test on the router interface generates router measurements;

collect the customer premise equipment measurements associated with the customer premise equipment and the router measurements associated with the communication service provider router based on the association;

determine whether the customer premise equipment measurements and the router measurements are normal based on an analysis of the customer premise equipment configuration and the router configuration;

in response to a determination that the customer premise equipment measurements and the router measurements are not normal, identify that a cause of the abnormal measurements includes at least a mismatch between the customer premise equipment configuration and the router configuration;

store bi-directional information associated with the customer premise equipment and the communication service provider router in a datastore of the communication service provide; and change at least one of the customer premise equipment configuration to an acceptable customer premise equipment configuration or the router configuration to an acceptable router configuration based on i) the cause of the difference, and ii) a solution for the cause which is obtained by comparing the cause, the customer premise equipment configuration, the router configuration, or a combination thereof with information previously stored on the datastore of the communication service provider, wherein the information previously stored comprises a previously stored cause, a previously stored bi-directional information, a previously stored customer behavior, or a combination thereof.

9. The troubleshooting tool of claim 8, further comprising instructions stored in memory which, when executed by a processor, perform the steps of:
monitoring a customer behavior regarding the bi-lateral data connection; and
storing the customer behavior in the datastore.

10. The troubleshooting tool of claim 8, further comprising instructions stored in memory which, when executed by a processor, perform the steps of:
opening a trouble ticket;
populating the trouble ticket with the bi-directional information to create a populated trouble ticket; and
storing the populated trouble ticket in the datastore.

11. The troubleshooting tool of claim 10, further comprising instructions stored in memory which, when executed by a processor, perform the steps of:
presenting the populated trouble ticket to a user;
receiving a comment from the user regarding the populated trouble ticket; and
storing the comment regarding the populated trouble ticket in the datastore.

12. The troubleshooting tool of claim 10, further comprising instructions stored in memory which, when executed by a processor, perform the steps of:
linking the populated trouble ticket with a customer behavior, a previously stored trouble ticket, a previously stored bi-directional information, a previously stored customer behavior, a previously stored uni-directional information, or a combination thereof.

13. The troubleshooting tool of claim 10, wherein opening a trouble ticket comprises:
automatically opening a trouble ticket upon the occurrence of a trigger condition.

14. A system for bi-lateral data connection troubleshooting a communication service by using a communication service troubleshooting tool, comprising:
a customer premise equipment comprising a customer premise equipment interface that is configured for the communication service, wherein the customer premise equipment resides in a customer network;
a communication service provider router comprising a router interface that is configured for the communication service, wherein the communication service provider router resides in a communication service provider network, the communication service provider router providing the communication service to the customer premise equipment;
a datastore in the communication service provider network; and
a communication service troubleshooting tool that, upon execution of at least one processor, the communication service troubleshooting tool:
creates an association between the customer premise equipment and the communication service provider router;
determines a customer premise equipment configuration of the customer premise equipment in the customer network and a router configuration of the communication service provider router in the communication service provider network providing communication services to the customer premise equipment based on the association;
responsive to determination of the customer premise equipment configuration and the router configuration, initiates at least one network test on the customer premise equipment interface and at least one network test on the router interface, each of the at least one network tests are separate and initiated simultaneously, wherein the at least one network test on the customer premise equipment interface generates customer premise equipment measurements, and the at least one network test on the router interface generates router measurements;
collects the customer premise equipment measurements associated with the customer premise equipment and the router measurements associated with the communication service provider router based on the association;
determines whether the customer premise equipment measurements and the router measurements are normal based on an analysis of the customer premise equipment configuration and the router configuration;
in response to a determination that the customer premise equipment measurements and the router measurements are not normal, identifies that a cause of the abnormal measurements includes at least a mismatch between the customer premise equipment configuration and the router configuration;
stores bi-directional information associated with the customer premise equipment and the communication service provider router in the datastore; and
changes at least one of the customer premise equipment configuration to an acceptable customer premise equipment configuration or the router configuration to an acceptable router configuration based on i) the cause of the difference, and ii) a solution for the cause which is obtained by comparing the cause, the customer premise equipment configuration, the router configuration, or a combination thereof with information previously stored on the datastore of the communication service provider,
wherein the information previously stored comprises a previously stored cause, a previously stored bi-directional information, a previously stored customer behavior, or a combination thereof.

15. The system of claim 14, wherein the communication service troubleshooting tool:
monitors a customer behavior regarding the bi-lateral data connection; and
stores the customer behavior in the datastore.

16. The system of claim 14, wherein the communication service troubleshooting tool:
opens a trouble ticket;
populates the trouble ticket with the bi-directional information to create a populated trouble ticket; and
stores the populated trouble ticket in the datastore.

17. The system of claim 16, wherein the communication service troubleshooting tool:
links the populated trouble ticket with a customer behavior, a previously stored trouble ticket, a previously stored bi-directional information, a previously stored customer behavior, a previously stored uni-directional information, or a combination thereof.

18. The system of claim 14, wherein the communication service troubleshooting tool:

automatically opens a trouble ticket upon the occurrence of a trigger condition.

* * * * *